April 22, 1947.  F. J. METZGER  2,419,275
PRODUCTION OF 1,3-BUTYLENE GLYCOL
Filed May 17, 1944
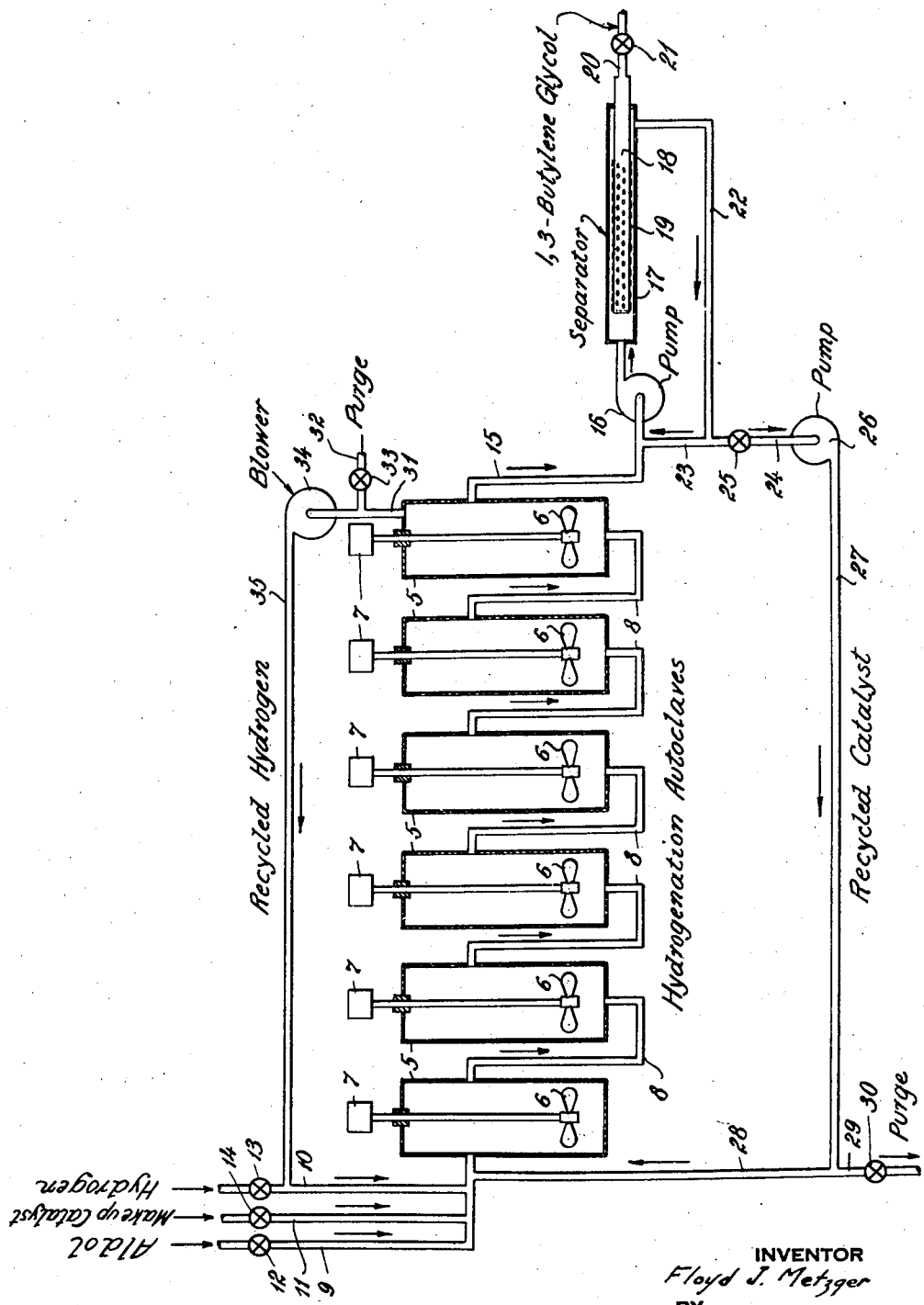
INVENTOR
Floyd J. Metzger
BY
Pennie Davis Marvin & Edmonds
ATTORNEYS Patented Apr. 22, 1947

2,419,275

UNITED STATES PATENT OFFICE 2,419,275

PRODUCTION OF 1,3-BUTYLENE GLYCOL

Floyd J. Metzger, New York, N. Y., assignor to Air Reduction Company, Incorporated, New York, N. Y., a corporation of New York Application May 17, 1944, Serial No. 535,940

2 Claims. (Cl. 260—635)

This invention relates to the continuous hydrogenation of aldol to produce 1,3-butylene glycol and particularly to an improvement permitting the practice of the method on a commercial scale and in an efficient manner.

Continuous hydrogenation of aldol has been proposed heretofore. The method involves suspension of the catalyst, preferably an active form of nickel, in the liquid which is subjected to the action of hydrogen under substantial pressure. When the reaction is completed, the liquid product 1,3-butylene glycol, is withdrawn with the catalyst still suspended therein.

In order to separate the catalyst from the product, it has been the practice heretofore to subject the slurry to filtration at or about atmospheric pressure in one of the usual types of filters. The filter cake of catalyst is necessarily exposed to the oxygen of the air. It is well known that active hydrogenation catalysts, and particularly nickel catalysts, are extremely reactive with oxygen. Momentary exposure to air, or even to an atmosphere containing a much lower proportion of oxygen than does ordinary air, will result in the formation of nickel oxide. There is considerable loss of catalytic activity, and the catalyst may in fact become useless after such treatment.

To avoid this difficulty, it has been suggested that the catalyst be separated by allowing the suspension to stand until suspended particles have settled and collected at the bottom of a container. The settling rate of the finely divided catalyst is usually very slow, and the supernatant liquid ordinarily has to be filtered because it contains small amounts of catalyst. To practice this procedure, large reservoir space must be provided, so that the procedure is both unsatisfactory and uneconomical.

It is the object of the present invention to provide a method of hydrogenating aldol in which the catalyst is separated continuously from the 1,3-butylene glycol product and returned for further use without exposure to the possibility of oxidation or other conditions which might effect deterioration.

Another object of the invention is the provision of a method of continuously separating a catalyst in liquid suspension from a stream of 1,3-butylene glycol so that the latter may be recovered and the catalyst suspension may be returned to the reaction for further use.

Other objects and advantages of the invention will be apparent as it is better understood by reference to the following specification and the accompanying drawing, which illustrates diagrammatically an apparatus suitable for the practice of the invention.

In carrying out the invention, I may utilize any suitable hydrogenation catalyst. I prefer an active nickel catalyst such as Raney nickel in finely divided form. It is, however, practicable to use other catalysts such for example as nickel deposited on a carrier. Any suitable carrier may be utilized, but activated clays such as "Super Filtrol" have been found to be most effective. The carrier may be impregnated with an aqueous nickel nitrate solution in quantity sufficient to afford a nickel compound of approximately 50% by weight of the finished catalyst, and dried prior to use.

The aldol is preferably fed to a suitable autoclave or series of autoclaves, together with a slurry of the catalyst in aldol, the mixture being subjected in the autoclaves to agitation with hydrogen supplied at a pressure of between 300 and 800 pounds per square inch while the temperature is maintained between 45° and 120° C. At the conclusion of the reaction, the slurry of catalyst in the 1,3-butylene glycol which is the product of the reaction is withdrawn from the last autoclave of the series and delivered to the separator.

Separation is effected in a continuous manner by directing the slurry at a rate of flow sufficient to maintain the suspension over a porous surface through which the 1,3-butylene glycol is withdrawn, leaving the catalyst still in suspension in the stream of slurry which leaves the separator. The slurry is then returned to the first of the series of autoclaves where it is mixed with fresh aldol and additional catalyst if necessary to maintain the proportion thereof required to ensure the desired reaction. Some of the slurry of catalyst leaving the separator may be returned thereto, if desired, to effect separation of some of the 1,3-butylene glycol therein. I find, however, that in general the catalyst may be separated effectively without exposure to the atmosphere and returned for further use in the reaction while the 1,3-butylene glycol is withdrawn in a continuous manner and free from catalyst. Thus continuous hydrogenation is maintained without substantial loss of activity of the catalyst and the desired product is separated continuously from the reaction.

Referring to the drawing, a plurality of autoclaves 5, each provided with a stirrer 6 driven by a motor 7 or other convenient mechanical device, are connected by pipes 8 which permit passage of the slurry continuously through the autoclaves during the reaction. Aldol is fed continuously through a pipe 9 and hydrogen is delivered through a pipe 10. Additonal catalyst may be supplied through the pipe 11, preferably in the form of a slurry of the catalyst in aldol. The pipes 9, 10 and 11 are controlled by valves 12, 13 and 14. The hydrogen is introduced under a pressure of 300 to 800 pounds per square inch, and the autoclaves are maintained substantially at that pressure. Any suitable means may be employed to maintain the temperature of the slurry undergoing reaction within the range between 45° and 120° C.

The product, including the catalyst, is withdrawn through a pipe 15 and delivered by a pump 16 to the separator which in its simplest form comprises an outer pipe 17 and an inner pipe 18 having a plurality of openings 19. The surface of the pipe 18 is covered with a piece of filter cloth of some suitable corrosion resistant material such as Monel metal. The filter cloth should preferably be about 50 x 700 mesh, thus affording a barrier for the particles of catalyst while permitting the liquid to flow freely to the interior of the pipe 18. An outlet 20 provided with a valve 21 permits withdrawal of 1,3-butylene glycol. The remaining slurry containing the catalyst with some of the 1,3-butylene glycol is withdrawn through a pipe 22 and a part may be recirculated through a pipe 23 so that it again passes through the separator. The major portion of the slurry is withdrawn through a pipe 24 controlled by a valve 25 and is delivered by a pump 26 and pipe 27 to a pipe 28 which returns it to the first of the series of autoclaves 5. A purge line 29 provided with a valve 30 permits withdrawal of the slurry when the catalyst activity has been depleted or for any other reason.

The hydrogen from the last of the autoclaves 5 is withdrawn through a pipe 31 to which a purge line 32 controlled by a valve 33 may be connected. The hydrogen is returned by a blower 34 through a pipe 35 to the pipe 10 so that it may be recirculated through the autoclaves.

In order that separation of the catalyst slurry from the bulk of the 1,3-butylene glycol may be effected without clogging the separator, it is necessary that the flow of the suspension be maintained at such a rate that solid particles will not settle on the surface through which the liquid product is withdrawn. The rate of flow in an apparatus such as that described should be about 12 linear feet per second. It is to be understood that the rate of flow will vary with the nature and fineness of the catalyst. It will also vary in different types of apparatus. The simple form of separator illustrated is merely a type. Obviously the number of tubes may be multiplied or other forms of elements designed to permit the passage of liquid therethrough may be utilized in place of tubes so long as the fundamental conditions are maintained. These conditions are that the slurry travels at a speed such that solid particles therein will not separate on the foraminous surface through which the liquid is withdrawn. Any type of apparatus adapted to accomplish this result may be utilized for the purpose of the present invention. The rate of flow will be adjusted to accomplish the necessary function of separating the liquid product while the solid particles are withdraw still in liquid suspension.

In an apparatus such as that described, the rate at which the clear liquid product is withdrawn from the separator may be regulated by adjustment of the valve 21. Increasing the opening of the valve increases the pressure drop across the foraminous surface of the separator and hence results in increased flow of liquid from the separator. This adjustment will be made so as to ensure practical operation of the primary function of the separator as hereinbefore described.

The method of hydrogenation of aldol as herein set forth permits rapid and uniform treatment of the aldol, the continuous recovery of 1,3-butylene glycol and the continuous separation and return of the catalyst without exposure to the atmosphere or other cause of deterioration. Hence the catalyst can be used most effectively and without the necessity for frequent addition of the relatively expensive catalyst. The improvement permits the practical and commercial application of hydrogenation in the conversion of aldol to 1,3-butylene glycol.

Various changes may be made in the details of procedure as well as in the apparatus employed without departing from the invention or sacrificing the advantages thereof.

I claim:

1. The method of continuously hydrogenating aldol to produce 1,3-butylene glycol, which comprises subjecting aldol containing a readily oxidizable comminuted solid hydrogenation catalyst suspended therein to the action of hydrogen under superatmospheric pressure in a reaction zone, continuously withdrawing from the reaction zone a slurry consisting of the catalyst suspended in the liquid product of the reaction, the withdrawal of said slurry being without substantial reduction of pressure in the reaction zone, dividing the withdrawn slurry into two components by means of a foraminous surface, one component being a clear liquid and the other component a thickened slurry containing the catalyst, such division of the slurry being at a rate such that substantial deposition of catalyst on the foraminous surface does not take place and the pressure on the slurry undergoing division is not substantially reduced, withdrawing the clear liquid from the system, retaining the thickened slurry containing the catalyst in the system and returning it to the zone of reaction, and maintaining the entire system closed to the external atmosphere.

2. The method of continuously hydrogenating aldol to produce 1,3-butylene glycol as set forth in claim 1 in which the readily oxidizable comminuted solid hydrogenation catalyst comprises an active nickel catalyst.

FLOYD J. METZGER.

REFERENCES CITED

The following references are of record in the file of this patent:

UNITED STATES PATENTS

| Number | Name | Date |
|---|---|---|
| 1,079,278 | Wilbuschewitsch | Nov. 18, 1913 |
| 1,907,855 | Mueller-Cunradi et al. | May 9, 1933 |
| 1,940,651 | Semmes | Dec. 19, 1933 |
| 1,961,980 | Mueller-Cunradi et al. | June 5, 1934 |
| 2,284,273 | Franklin | May 26, 1942 |